United States Patent (12) United States Patent
Geren (10) Patent No.: US 9,209,676 B2
(45) Date of Patent: Dec. 8, 2015

(54) METHOD AND APPARATUS FOR CHARGING BATTERIES HAVING DIFFERENT VOLTAGE RANGES WITH A SINGLE CONVERSION CHARGER

(71) Applicant: MOTOROLA SOLUTIONS, INC., Schaumburg, Illinois, IL (US)

(72) Inventor: Michael D. Geren, Suwanee, GA (US)

(73) Assignee: Motorola Solutions, Inc., Schaumburg, IL (US)

( * ) Notice: Subject to any disclaimer, the term of this patent is extended or adjusted under 35 U.S.C. 154(b) by 456 days.

(21) Appl. No.: 13/708,077

(22) Filed: Dec. 7, 2012

(65) Prior Publication Data
US 2014/0159641 A1 Jun. 12, 2014

(51) Int. Cl.
H02J 7/00 (2006.01)
H02M 1/32 (2007.01)
H02J 7/02 (2006.01)
H02M 3/335 (2006.01)

(52) U.S. Cl.
CPC .................. *H02M 1/32* (2013.01); *H02J 7/022* (2013.01); *H02M 3/335* (2013.01)

(58) Field of Classification Search
USPC .................................................. 320/106, 108
See application file for complete search history.

(56) References Cited

U.S. PATENT DOCUMENTS

| 4,031,449 | A | * | 6/1977 | Trombly | 320/108 |
|---|---|---|---|---|---|
| 6,081,096 | A | | 6/2000 | Barkat et al. | |
| 6,605,926 | B2 | | 8/2003 | Crisp et al. | |
| 6,937,180 | B1 | | 8/2005 | Muratov et al. | |
| 7,576,514 | B2 | | 8/2009 | Hui | |
| 7,705,561 | B2 | * | 4/2010 | Yano | 320/118 |
| 7,728,558 | B2 | | 6/2010 | Tam | |
| 7,755,330 | B2 | | 7/2010 | Formenti et al. | |
| 8,125,189 | B2 | | 2/2012 | Formenti | |
| 2004/0232878 | A1 | | 11/2004 | Couch et al. | |
| 2006/0232244 | A1 | | 10/2006 | Formenti | |
| 2008/0079392 | A1 | * | 4/2008 | Baarman et al. | 320/108 |
| 2008/0174269 | A1 | | 7/2008 | DeRome et al. | |
| 2009/0016086 | A1 | | 1/2009 | Huynh et al. | |
| 2009/0295469 | A1 | | 12/2009 | DuBose | |
| 2010/0133916 | A1 | * | 6/2010 | Sato | 307/104 |
| 2011/0089898 | A1 | | 4/2011 | Lee et al. | |
| 2011/0128153 | A1 | | 6/2011 | Sims et al. | |
| 2011/0128253 | A1 | | 6/2011 | Yoon et al. | |
| 2011/0309802 | A1 | | 12/2011 | Hoffman et al. | |
| 2012/0001596 | A1 | | 1/2012 | Meyer et al. | |

(Continued)

OTHER PUBLICATIONS

Non-Final Rejection mailed May 28, 2013 in U.S. Appl. No. 12/195,585, John W. Oglesbee, filed Dec. 3, 2010.

(Continued)

*Primary Examiner* — Samuel Berhanu
(74) *Attorney, Agent, or Firm* — Barbara R. Doutre (57) ABSTRACT

Embodiments for a battery charger include a single conversion switched mode power supply having a bias winding on the primary side of the power transformer. The bias winding produces an output that is proportional to the voltage produced on the secondary winding, and is sensed by a programmable voltage sensing circuit. The programmable voltage sensing circuit is programmed by a voltage select signal from the secondary side of the charger to produce an sense signal that is proportional to the output of the bias winding by a selected factor corresponding to a battery type of a battery being charged.

17 Claims, 4 Drawing Sheets

(56) References Cited

U.S. PATENT DOCUMENTS

2012/0133324 A1   5/2012   Baarman et al.
2012/0139477 A1   6/2012   Oglesbee et al.

OTHER PUBLICATIONS

Notice of Allowance mailed Oct. 10, 2013 in U.S. Appl. No. 12/959,585, John W. Oglesbee, filed Dec. 3, 2010.
Power Integrations. "Reference Design Report for 2.4 W Charger Using LNK603DG," Document RDR-159, Oct. 2, 2008, pp. 40.
Power Integrations, "Reference Design Report for a 35 W Power Supply Using TOP258PN," Document RDR-142, Dec. 7, 2007, pp. 40.
Power Integrations, "TOP252-262 TOPSwitch-HX Family," Jan. 2009, pp. 48.
Corresponding International Application No. PCT/US2013/071699—International Search Report dated Feb. 20, 2015.
TEA1623P / TEA1623PH Datasheet—NXP—STARplug switched mode power supply controller IC—Aug. 2010—20 pages.

\* cited by examiner

METHOD AND APPARATUS FOR CHARGING BATTERIES HAVING DIFFERENT VOLTAGE RANGES WITH A SINGLE CONVERSION CHARGER

FIELD OF THE DISCLOSURE

The present disclosure relates generally to battery chargers, and more particularly to battery chargers using a single conversion power supply to charge multiple battery types having different maximum voltage cutoff levels.

BACKGROUND

The increasing rise in the popularity of portable and mobile electronic devices, which are often powered by rechargeable batteries, has resulted in a corresponding need for efficient, low cost battery chargers that can recharge the battery (or batteries) in a reasonable period of time. All battery chargers that are powered by standard alternative current (AC) service perform an AC to DC (direct current) conversion. For low power chargers that provide a "slow" charge, the AC to DC conversion can be performed by simple rectification and current restriction. However, for "fast" charging, where a fully discharged battery can be fully charged in a matter of a couple hours, or less, the charging current and voltage requires more careful regulation, and typically employ switched mode power conversion techniques.

In some conventional rapid charging systems it is common to use an AC to DC converter to generate a "stepped down" DC voltage, which takes the input AC, rectifies it to a high DC level on the primary side, and converts the high DC to the stepped down DC voltage level on the secondary side. A DC to DC regulator, such as a "buck" regulator, is used to provide a regulated charging current and voltage to a battery from the stepped down DC level. This AC to DC to DC approach can be referred to as a "dual stage conversion" approach because the voltage is converted twice; from the input AC to the stepped down DC, then from the stepped down DC to the battery voltage.

The dual stage conversion approach works well, and allows the output to be varied over a wide range of voltage and current. However, because of the large number of power components involved, battery chargers using this kind of power conversion tend to be more expensive than a battery charger using a single conversion approach.

A single conversion power supply converts the input AC directly to the desired output charging current and voltage. Accordingly, there is no need for the DC to DC second stage. In a single conversion power supply control information can be communicated from the secondary side to the primary side over isolation links, such as opto-isolators. The isolation of the secondary, output side from the primary, input side of the power converted is necessitated by safety considerations to prevent the high AC from having a path to the secondary side, and is required by regulation in switched mode converters. The information that can be provided to the primary side can be used, for example, to control the electric current output, voltage limiting, and so on. For safety considerations it is desirable to sense output conditions on the primary side, such as by using an additional winding on the primary side. This is because of the time delay in sensing on the secondary side and communicating feedback across the isolation gap to the primary side control circuitry. The additional winding can be used to sense output voltage on the secondary side, and therefore allow for avoiding over-voltage conditions at the output.

Some chargers are required to charge different types of batteries that have different voltage requirements. What can be a typical voltage for one type of battery can be an unsafe, over-voltage condition for another type of battery. In a battery charger using a single conversion system, the sensing range produced by the additional winding may be too wide to sense an abnormally high voltage applied to a lower voltage battery. Typical charging limits are approximately two percent above 4.2V.

Accordingly, there is a need for battery charger using a single conversion power converter that is capable of charging multiple types of batteries having different voltage requirements while preventing over-voltage conditions when charging each type of battery.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments include a battery charger that comprises a single conversion switched mode power supply. The single conversion power supply includes a transformer that defines a primary side and a secondary side of the battery charger and converts an input alternating current (AC) power on the primary side to a direct current (DC) charging current on the secondary side. The charging current is provided to a charging interface that is configured to connect the charger to a rechargeable battery. The battery charger also includes a bias winding on the primary side of the power transformer that provides an output corresponding to an output of the secondary side of the power transformer. A programmable voltage sensing circuit senses the output of the bias winding and produces a voltage sensing output that is proportional to the output of the bias winding by a selected factor. A comparison circuit compares the sensing output to a reference and generates a fault signal when the voltage sensing output exceeds the reference. The single conversion switched mode power supply also includes a switched mode control circuit that controls the single conversion switched mode power supply to produce charging current, and shuts off the switched mode power supply responsive to the fault signal.

Figure 1:
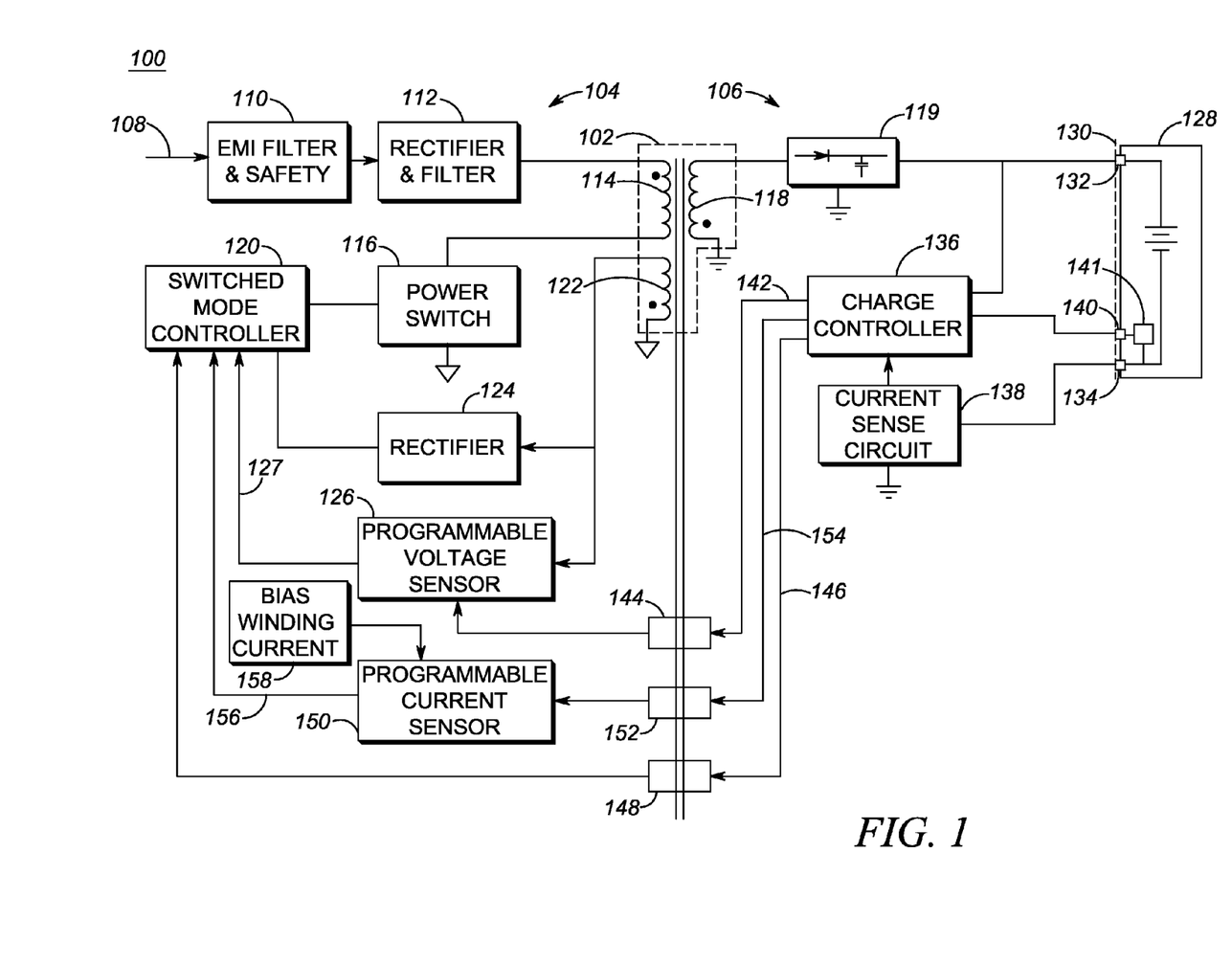
FIG. 1 is a block diagram of a battery charger using a single conversion power supply in accordance with some embodiments.

FIG. 1 is a block diagram of a battery charger 100 using a single conversion switched mode power supply in accordance with some embodiments. The single conversion switched mode power supply includes a power transformer 102 that has a primary side 104 and a secondary side 106. The primary side 104 and secondary side 106 are physically isolated from each other to prevent the high voltage used on the primary side 104 from being available or evident at the secondary side even under reasonable fault conditions. The single conversion power supply is powered by an alternating current (AC) source 108, such as a standard household AC service. The AC source passes through an electromagnetic interference (EMI) filter and safety block 110 that prevents conducted EMI from leaving the battery charger 100. The EMI filter and safety block 110 further includes safety circuitry that protects against high voltage spikes that can be experienced on the AC source 108, such as, for example, varistors, fuses, and other safety components, as is known. The filtered AC source is rectified by rectifier and filter circuit 112 that includes a diode rectifier bridge and bulk filter capacitor. The output of the rectifier and filter block is a high DC level. If the input is 120 volts RMS, the output of the rectifier and filter block 112 can be on the order of 170 volts DC. The output of the rectifier and filter block 112 is fed to the primary winding 114 of the power transformer 102, which is further coupled to a power switch 116 that is controlled by a switched mode controller 120. The switched mode controller 120 is a pulse width modulation controller, and operates the power switch 116 to draw current through the primary winding 114, thereby magnetizing the transformer core (around which the primary winding is wound). When the power switch 116 is closed the magnetic energy is dissipated via a secondary winding 118, which has the opposite polarity of the primary winding. Current is output from the secondary winding 118 and is rectified and filtered at a secondary rectifier block 119. When the secondary winding is not outputting current, such as when the primary side is drawing current through the primary winding 114 during the primary conduction cycle, the secondary rectifier within the secondary rectifier block 119 is not conducting, and a large capacitor block continues sourcing energy to the battery load. Current from the secondary rectifier block 119 is a charging current that is provided to a charging interface 130, and in particular the positive contact 132 of the charging interface 130. The charging interface allows the charger 100 to connect to a rechargeable battery 128. The charging current passes through the battery, and in particular, one or more battery cells, and returns to the charger via a negative contact 134 of the charging interface 130, where it is sensed by a current sense circuit 138. The current sense circuit 138 may be implemented, for example, with an op-amp having a voltage reference and feedback configuration or other implementation. The current sense circuit provides an indication of the level of current to a charge controller 136. The charge controller 136 can be a microprocessor that is programmed to control the charger 100 to charge various types of batteries.

When a battery 128 is connected to the charger 100, the charge controller can determine the type of battery by, for example, reading information in a memory 141 of the battery 128 via an information contact 140. The charge controller determines a maximum voltage, or over-voltage, setting to be used in charging the battery. The over-voltage setting corresponds to a maximum safe voltage limit that the charger can provide to the battery via the positive contact 132. The battery information obtained from the memory 141 (or other storage means) is used by the charge controller 136 to determine a signal 142 to be output to a programmable voltage sensor 126 on the primary side via an isolation link 144, such as an opto-isolator. The programmable voltage sensor 126 senses the output of a bias winding 122 on the primary side 104 of the power transformer 102. The bias winding 122 has the same polarity as the secondary winding 118, and therefor produces a voltage output that is proportional to the voltage output by the secondary winding 118. The output of the bias winding 122 may also used to power the switched mode controller 120, and other circuitry on the primary side 104, by rectifying the output of the bias winding 122 at a rectifier 124 which can include filtering and regulating components as well. Alternatively, the switched mode controller 120 may be powered directly through a power switch in the switched mode controller by primary winding 114 while the bias winding 122 operates as a signal interface.

The programmable voltage sensor 126 samples the output of the bias winding and produces a sense signal 127 that is at a selected proportion of the output of the bias winding. The proportion is selected by the signal 142, which configures the programmable voltage sensor 126 to the desired proportion factor corresponding to the desired voltage limit for the battery being charged. The programmable voltage sensor can be a programmable voltage divider. The sense signal 127 is used by the switched mode controller by comparing the sense signal to a reference, and if the sense signal voltage exceeds the reference, the switched mode controller changes operation of the single conversion power supply to prevent an over-voltage condition at the charging interface 130. In some embodiments if the sense signal exceeds the reference the switched mode controller 120 can shut down the single conversion power supply until the load is removed from the charging interface 130. The switched mode controller 120 further receives a current feedback signal 146 from the charge controller 136 via an isolation link 148. The current feedback signal 146 causes the switched mode controller 120 to adjust the charge current provided to the charge interface 130.

In some embodiments over-current protection can be provided on the primary side 104 in addition to, or as an alternate, to the over-voltage protection provided by the programmable voltage sensor 126. To provide over-current protection, a programmable current sensor circuit 150 can be used to bias winding current 158, which is the current through the bias winding when the secondary winding 118 is conducting. The programmable current sensor 150 can comprise one or more programmable or selectable resistances to set a maximum output current sense signal on line 156 to the switched mode power controller 120. The programmable current sensor 150 is programmed by the charge controller 136 via an isolation link 152, such as an opto-isolator, by current select line 154. The charger controller determines the maximum current, or over-current limit, that can be output by the single conversion power supply, based on the battery type, and programs the programmable current sensor 150. The bias winding current produces a current sense signal 156 proportional to the resistance value of the programmable current sensor 150. The switched mode power controller compares the current sense signal 156 with a reference to determine if an over-current condition has occurred (e.g. the current sense signal level exceeds the reference). The resulting voltage produced by bias winding current 158 passing through the programmable resistance of the programmable current sensor 150 can be amplified to produce the current sense signal 156. In some embodiments the bias winding can pass through a fixed-value sense resistor in the programmable current sensor 150, and the gain of an amplifier that amplifies the voltage produced by the bias winding current passing through the fixed-value sense resistor can be programmed (e.g. adjusted) by the current select signal 154 to produce the current sense signal 156 at the desired proportion corresponding to the battery type.

The single conversion power supply, as shown here, includes the power transformer 102, EMI filter and safety components 110, rectifier and filter components 112, switched mode controller 120, power switch 116, output rectifier and filter components 119, and other circuitry necessary for power control. The single conversion power supply shown here is a flyback configuration, however those skilled in the art will appreciate that other single conversion power supply topologies can be used substantially equivalently, include half-bridge and full-bridge power supplies.

Figure 2:
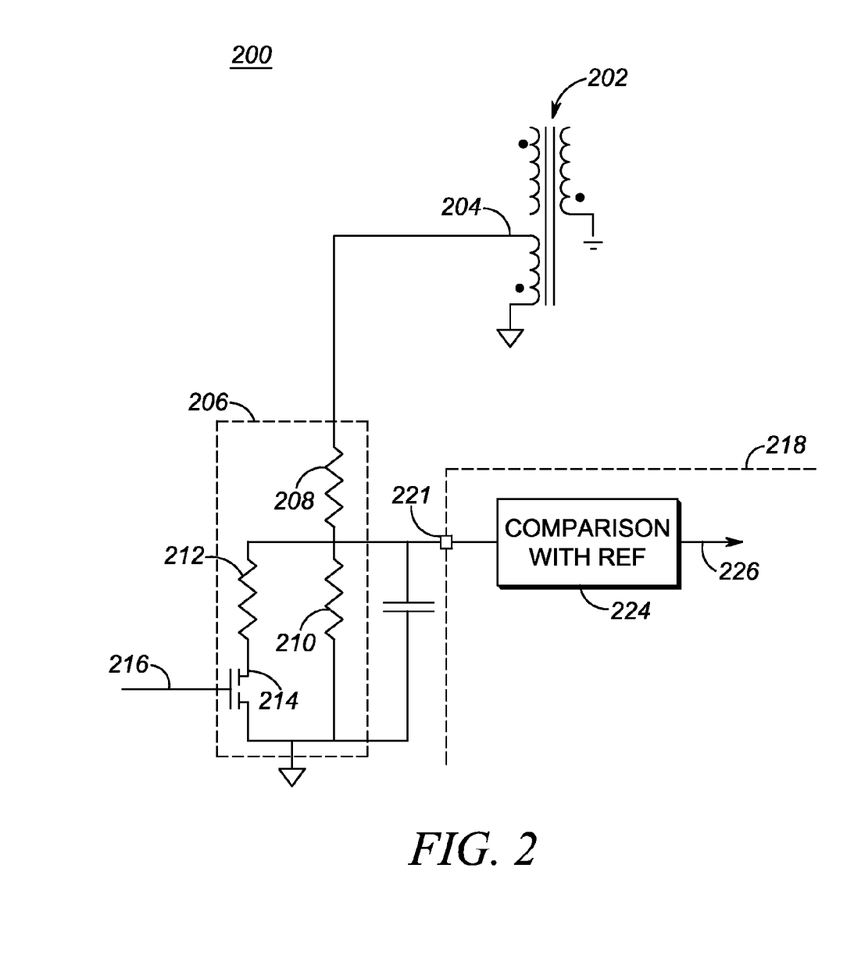
FIG. 2 is a schematic of a programmable voltage sensing circuit in accordance with some embodiments.

FIG. 2 is a schematic of a programmable voltage sensor 206 used in a section 200 of a battery charger in accordance with some embodiments. The output 204 of a bias winding of a power transformer 202 is provided to the programmable voltage sensor 206, which includes an adjustable voltage divider made up of resistors 208, 210, 212, and switch 214 that is operated responsive to a signal on input 216. Input is provided by the charger controller on the secondary side of the battery charger (not shown) and causes the switch 214 to be either opened or closed. When the switch 214 is closed, resistors 210 and 212 are connected in parallel, and when switch 214 is open resistor 212 is disconnected. By controlling the switch 214, the resistor divider can be changed by connecting or disconnecting resistor 212. The value of resistor 212 relative to resistors 208, 210 can be selected to change the proportion of the divider by the desired amount. The output of the resistor divider is the sense signal, which is proportional to the output 204 of the bias winding by the selected proportion. The sense signal is provided to the switched mode controller 218 which includes a comparison circuit 224.

The comparison circuit 224 compares the sense signal output of the voltage divider with a reference voltage. If the sense signal exceeds the voltage reference, the comparison circuit 224 can output a fault signal 226 to the pulse width modulation circuit that shuts down operation of the switched mode controller 218 to prevent an over-voltage condition. The voltage divider including resistor 208, 210, and 212, and switch 214, allow for two different settings of the programmable voltage sensor 206; one where resistor 212 is connected, and one where it is disconnected. Accordingly, two different over-voltage settings can be realized for two different battery types charged by the battery charger. Upon reading the battery information or otherwise determining the battery type, the charger controller, such as charger controller 136 of FIG. 1, can determine whether to open or close switch 216. The programmable voltage sensor 206 shown here is operable to provide two different settings, but additional settings can be realized by expanding on the number of switched resistors such as resistor 212.

Figure 3:
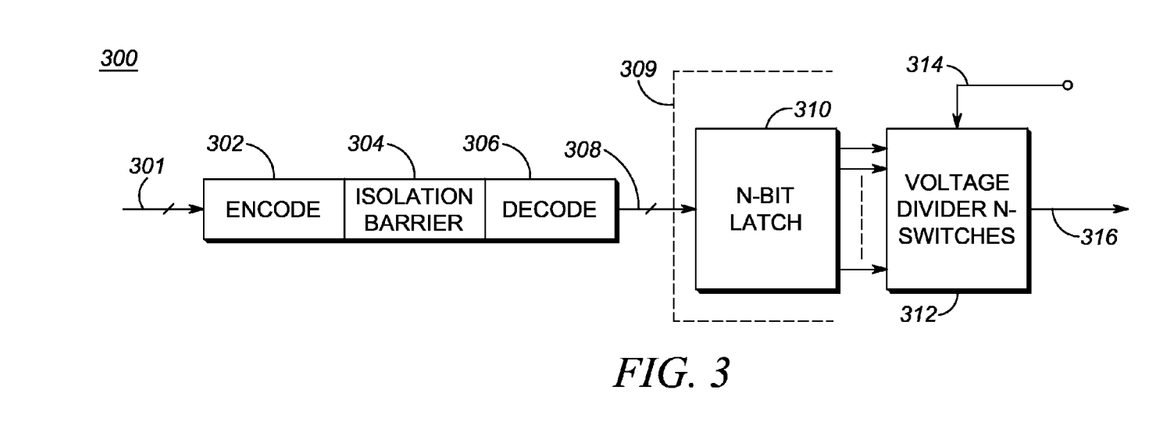
FIG. 3 is a block diagram of a signal path for a programmable voltage sensing circuit in accordance with some embodiments.

FIG. 3 is block diagram of a signal path 300 for a programmable voltage sensing circuit in accordance with some embodiments. A select signal 301 is provided by a charger controller, such as charge controller 136 of FIG. 1. The select signal in the present embodiments is a digital signal comprised of a plurality of bits that form a digital word that corresponds to a battery type of a battery presently being charged. The select signal 301 is fed to an encoder 302 that encodes the digital word and transmits it across an isolation barrier 304 to a decoder 306. The decoder 306 decodes the transmitted encoded signal to reproduce the select signal 308. The reproduced select signal 308 is provided to a programmable voltage sensor 309 that includes an n-bit latch 310 that latches the digital word of the select signal 308 and provides a latched digital output to a voltage divider 312, and specifically to n switches of the voltage divider 312 that each control a corresponding resistor in a divider network of the voltage divider 312. The voltage divider divides an input signal 314, such as the output of a bias winding to produce a sense signal 316 that is used by a comparison circuit to generate a fault signal when the sense signal exceeds a reference level, indicating the output voltage of the charger has exceeded a selected over-voltage level.

Figure 4:
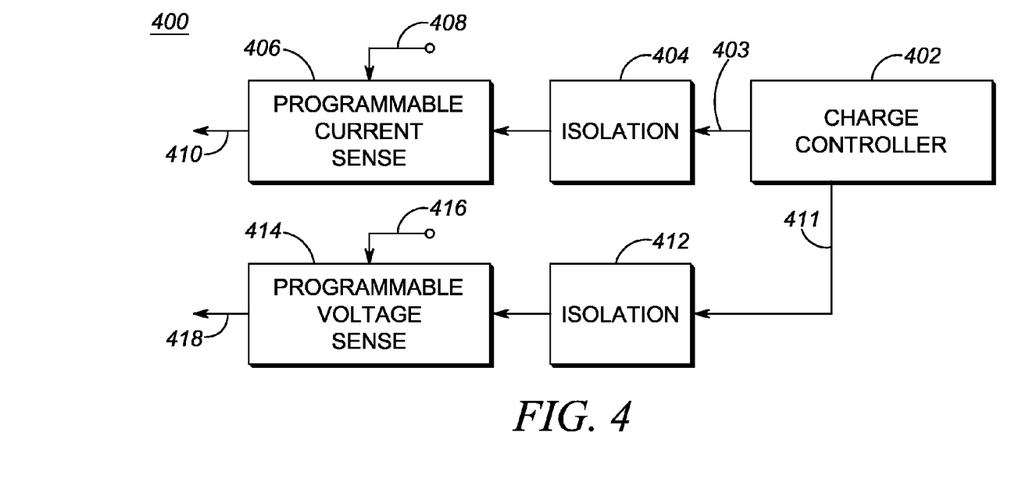
FIG. 4 is a block diagram of a sensing circuit that includes a programmable current sensing circuit and a programmable voltage sensing circuit in accordance with some embodiments.

FIG. 4 is a block diagram of a sensing circuit 400 that includes a programmable current sensing circuit and a programmable voltage sensing circuit in accordance with some embodiments. In addition to over-voltage conditions, there can be over-current conditions that can occur as a result of faults or other unexpected circumstances that result in the charger outputting an excessive current, despite control operations of the charge controller 402. The charge controller 402 provides a current select signal 403 to a programmable current sense circuit 406 through an isolation link 404. The isolation link 404 and programmable current sense circuit 406 would be additional components to those shown in FIG. 1. The current select signal 403 corresponds to a maximum current output, or over-current level that the charger is not to exceed. The over-current setting operates as an override to the normal current control feedback provided by the charge controller, such as current feedback signal 146 of FIG. 1. The programmable current sense circuit samples an input current 408 on the primary side, such as current through the bias winding, and provide a current sense signal 410 proportional to the input 408. The current sense signal 410 can be compared to a reference to generate a current fault signal that shuts down the switched mode operation to avoid an over-current condition. The input 408 is derived from a source that is proportional to the current provided to the charging interface of the charger. In some embodiments the input 408 can be derived from the secondary side of the charger via an optical isolator.

In addition to the programmable current sense circuit 406, the sensing circuit 400 further includes a programmable voltage sense circuit 414. The charge controller 402 generates a voltage select signal 411 that transmitted to the programmable sense circuit 414 via an isolation link 412. The programmable voltage sense circuit 414 produces a sense signal 418 that is proportional to an input 416 provided by the bias winding. The voltage select signal corresponds to the desired over-voltage limit as determined by the charge controller.

Figure 5:
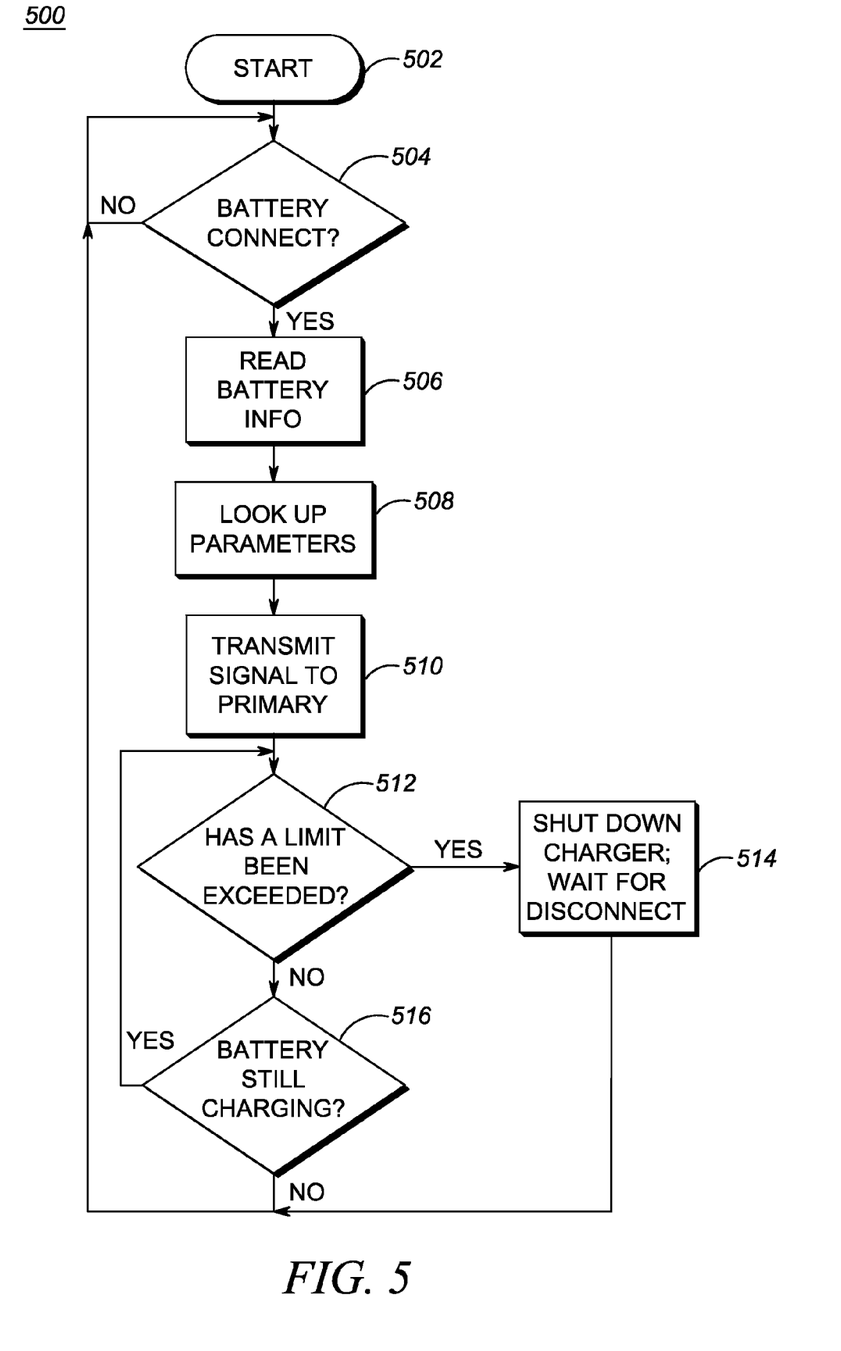
FIG. 5 is a flow chart diagram of a method of charging a battery in a battery charger having a single conversion power supply in accordance with some embodiments.

FIG. 5 is a flow chart diagram of a method 500 of charging a battery in a battery charger having a single conversion power supply in accordance with some embodiments. In the flow chart, various processes and sub-processes are abstracted into each of the boxes of the flow chart. At the start 502, the charger is powered on and ready to commence charging a battery. Accordingly, the charger waits to detect a battery as in process 504. The battery can be detected upon being placed in a pocket of the battery charger that is mechanically adapted to guide the battery into position such that contacts in the battery mate with corresponding contacts in the charger pocket, as is known. Upon detecting a battery, the charger reads the battery information as in process 506. The battery information can be stored in, for example, a memory of the battery, or by other means such as a coding resistor where the value of the coding resistor indicates the battery type. Upon reading the battery information, the charge controller can look up or otherwise determine corresponding information for the battery type regarding over-voltage and/or over-current limits as in process 508. The parameters are translated to a select signal that is transmitted to the primary side of the charger by the charge controller to the respective programmable sensing circuit (e.g. voltage, current) as in process 510. The select signal or signals cause the sensing circuits to be configured in a way corresponding to the desired over-voltage, over-current limits. If a limit is exceeded, as indicated by the sense signal of the programmable sense circuit, the charger is shut down to avoid an undesirable condition, as in processes 512, 514. Otherwise the battery continues to charge until it is finished charging or it is removed from the charger as in process 516.

By setting the desired over-voltage and/or over-current limits on the primary side, the charger, via the switched mode controller, can act faster in preventing an undesirable output condition from persisting. A charge controller operating on the secondary side typically samples the charging current and charging voltage periodically because, while charging a battery, those parameters change relatively slowly. There will be a certain period of time associated with processing the detection of an over-voltage or over-current condition on the secondary side and communicating an appropriate control signal across the isolation barrier. The embodiments taught here have the benefit of detecting the over-voltage or over-current condition on the primary side and responding faster than can typically occur only sensing on the secondary side. Furthermore, the embodiments taught here allow for the selection of the over-voltage and/or over-current limits used by the primary side circuitry to detect over-voltage or over-current conditions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A battery charger, comprising:
   a single conversion switched mode power supply including a power transformer, the transformer defines a primary side and a secondary side of the battery charger and converts an input alternating current (AC) power on the primary side to a direct current (DC) charging current on the secondary side, the DC charging current is provided to charging interface configured to connect to a rechargeable battery;
   a bias winding on the primary side of the power transformer that provides an output corresponding to output of the secondary side of the power transformer;
   a programmable voltage sensing circuit that senses the output of the bias winding and produces a voltage sensing output that is proportional to the output of the bias winding by a selected factor;
   a comparison circuit that compares the voltage sensing output to a reference voltage and generates a fault signal when the voltage sensing output exceeds the reference voltage; and
   the single conversion switched mode power supply include a switched mode control circuit that controls the single conversion switched mode power supply to produce the DC charging current, and which shuts off the switched mode power supply responsive to the fault signal; and
   a programmable current sensing circuit on the primary side that produces a current sensing signal that is selectively proportional to the charging current, and the current sensing signal being provided to the comparison circuit, and the comparison circuit produces the fault signal if the current sensing signal indicates the DC charging current has exceeded an over-current limit.

2. The battery charger of claim 1, wherein the programmable voltage sensing circuit is operably coupled to a controller on the secondary side of the battery charger via an isolated communication link.

3. The battery charger of claim 2, wherein the isolated communication link is an opto-isolater.

4. The battery charger of claim 1, wherein the programmable voltage sensor comprises a circuit for setting a maximum over-voltage level.

5. The battery charger of claim 4, wherein the programmable voltage sensor comprises a programmable resistor divider network.

6. The battery charger of claim 1, wherein the programmable voltage sensing circuit is set such that the fault signal occurs when an over-voltage condition occurs on the secondary side of the transformer.

7. The battery charger of claim 6, wherein the over-voltage condition is based on a battery type of a battery being charged, and wherein the programmable voltage sensing circuit is programmed based on the battery type.

8. The battery charger of claim 1, wherein the single conversion switched mode power supply is a flyback power supply.

9. The battery charger of claim 1, wherein the programmable current sensing circuit is programmed by a controller on the secondary side via an isolated communication link.

10. A battery charger, comprising:
    a single conversion switched mode power supply including a power transformer, the transformer defines a primary side and a secondary side of the battery charger and converts an input alternating current (AC) power on the primary side to a direct current (DC) charging current on the secondary side, the DC charging current is provided to charging interface configured to connect to a rechargeable battery;
    a bias winding on the primary side of the power transformer that provides an output corresponding to output of the secondary side of the power transformer;
    a programmable voltage sensing circuit that senses the output of the bias winding and produces a voltage sensing output that is proportional to the output of the bias winding by a selected factor;
    a comparison circuit that compares the voltage sensing output to a reference voltage and generates a fault signal when the voltage sensing output exceeds the reference voltage; and
    the single conversion switched mode power supply include a switched mode control circuit that controls the single conversion switched mode power supply to produce the DC charging current, and which shuts off the switched mode power supply responsive to the fault signal;
    a programmable current sensing circuit on the secondary side that produces a current sensing signal that is selectively proportional to the charging current; and
    the current sensing signal is provided to the switched mode control circuit on the primary side.

11. The battery charger of claim 10, wherein the programmable current sensing circuit on the primary side is programmed by a charge controller on the secondary side via an isolated communication link.

12. A method of operating a battery charger, comprising:
    detecting connection of a battery to the battery charger;
    determining a battery type of the battery;
    communicating a voltage select signal corresponding to an over-voltage limit for the battery type from a secondary side of the battery charger to a programmable voltage sensor on a primary side of the battery charger, wherein the programmable voltage sense circuit senses an output of a bias winding on the primary side of a power transformer and provides a voltage sense signal that is proportional to the output of the bias winding by a selected factor, wherein the voltage select signal sets the programmable voltage sense circuit to the selected factor;
    comparing the voltage sense signal with a reference voltage;
    producing a fault signal in response to the voltage sense signal exceeding the reference voltage; and
    shutting down a power supply of the battery charger in response to the fault signal further comprising:
    communicating a current select signal from the secondary side of the battery charger to the a programmable current sense circuit on the primary side of the battery charger, the current select signal corresponding to a over-current limit of the battery type, wherein the programmable current sense circuit provides a current sense signal that is proportional to a DC charging current provided to the battery by a selected proportion, and wherein the current select signal configures the programmable current sense circuit according to the selected proportion;
    comparing the current sense signal with a reference; and
    shutting down the power supply when the current sense signal exceeds the reference.

13. The method of claim 12, wherein communicating the voltage select signal comprises communicating an on/off signal to a switch in the programmable voltage sensor.

14. The method of claim 12, wherein communicating the voltage select signal comprises communicating a digital word to the programmable voltage sensor comprising a plurality of bits, each bit corresponding to one of a plurality of switches in the programmable voltage sensor that each control connection of a resistance in a voltage divider network.

15. The method of claim 12, wherein communicating the voltage select signal comprises communicating the voltage select signal over an optical link between the primary and secondary sides of the battery charger.

16. The method of claim 12, wherein shutting down the power supply comprises shutting down a single conversion power supply.

17. The method of claim 12, wherein shutting down the power supply comprises shutting down the power supply until the battery is removed from the charger.

* * * * *